(12) United States Patent
Lee

(10) Patent No.: US 10,699,054 B2
(45) Date of Patent: Jun. 30, 2020

(54) STANDARD CELL LIBRARY, INTEGRATED CIRCUIT INCLUDING SYNCHRONOUS CIRCUIT, AND COMPUTING SYSTEM FOR DESIGNING THE INTEGRATED CIRCUIT

(71) Applicant: Samsung Electronics Co., Ltd., Suwon-si, Gyeonggi-do (KR)

(72) Inventor: Bong-hyun Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/998,852

(22) Filed: Aug. 17, 2018

(65) Prior Publication Data

US 2019/0057179 A1 Feb. 21, 2019

(30) Foreign Application Priority Data

Aug. 18, 2017 (KR) .................. 10-2017-0104520
Mar. 22, 2018 (KR) .................. 10-2018-0033490

(51) Int. Cl.
| | |
|---|---|
| H03K 3/037 | (2006.01) |
| G06F 30/398 | (2020.01) |
| G06F 30/327 | (2020.01) |
| G06F 30/392 | (2020.01) |
| G06F 30/394 | (2020.01) |
| G06F 30/3312 | (2020.01) |
| G06F 30/34 | (2020.01) |
| G06F 30/333 | (2020.01) |
| G06F 119/12 | (2020.01) |

(52) U.S. Cl.
CPC .......... *G06F 30/398* (2020.01); *G06F 30/327* (2020.01); *G06F 30/3312* (2020.01); *G06F 30/392* (2020.01); *G06F 30/394* (2020.01); *H03K 3/0372* (2013.01); *G06F 30/333* (2020.01); *G06F 30/34* (2020.01); *G06F 2119/12* (2020.01)

(58) Field of Classification Search
CPC ............. G06F 17/5081; G06F 17/5072; G06F 17/5077; H03K 3/0372
See application file for complete search history.

(56) References Cited

U.S. PATENT DOCUMENTS

| | | |
|---|---|---|
| 5,003,204 A | 3/1991 | Cushing et al. |
| 5,426,650 A | 6/1995 | Ganapathy et al. |
| 5,519,714 A | 5/1996 | Nakamura et al. |
| 5,633,606 A | 5/1997 | Gaudet et al. |
| 6,622,253 B2 | 9/2003 | Bacon |

(Continued)

*Primary Examiner* — Dinh T Le
(74) *Attorney, Agent, or Firm* — Harness, Dickey and Pierce, P.L.C.

(57) ABSTRACT

An integrated circuit (IC) including a first synchronous circuit configured to operate in synchronization with a clock signal is provided. The first synchronous circuit includes a selector including a first input terminal configured to receive a first input signal, a second input terminal configured to receive a second input signal, and a third input terminal configured to receive a scan enable signal indicating one of a scan test mode and a function operation mode and a latch unit configured to operate as a flip-flop outputting a first output signal corresponding to the first input signal in the scan test mode and to operate as a latch outputting a second output signal corresponding to the second input signal in the function operation mode.

20 Claims, 10 Drawing Sheets

(56) References Cited

U.S. PATENT DOCUMENTS

| | | | |
|---|---|---|---|
| 7,467,318 | B2 | 12/2008 | Bruno et al. |
| 7,752,513 | B2 | 7/2010 | Namura et al. |
| 7,843,218 | B1 | 11/2010 | Ramaraju et al. |
| 8,078,925 | B1 | 12/2011 | Bhatia et al. |
| 8,667,349 | B2 | 3/2014 | Hsieh et al. |
| 8,829,965 | B2 | 9/2014 | Narayanan et al. |
| 8,943,375 | B2 | 1/2015 | Masleid et al. |
| 9,065,440 | B2 | 6/2015 | Chromczak |
| 9,160,314 | B2 | 10/2015 | Bartling et al. |
| 9,194,915 | B2 | 11/2015 | Bheemanna et al. |
| 9,312,866 | B2 | 4/2016 | Liu et al. |
| 9,372,233 | B2 | 6/2016 | Dia |
| 9,425,771 | B2 | 8/2016 | Nandi et al. |
| 2003/0188241 | A1 | 10/2003 | Zyuban et al. |
| 2003/0226077 | A1 | 12/2003 | Zyuban et al. |
| 2006/0095819 | A1* | 5/2006 | Bhatia ............ G01R 31/318541 714/726 |
| 2006/0195737 | A1 | 8/2006 | James |
| 2009/0300448 | A1* | 12/2009 | Tomita ........... G01R 31/318541 714/731 |
| 2010/0023817 | A1 | 1/2010 | Park et al. |
| 2010/0185909 | A1 | 7/2010 | Li et al. |
| 2013/0111285 | A1* | 5/2013 | Chakravarty .. G01R 31/318541 714/726 |
| 2016/0097811 | A1 | 4/2016 | Kim et al. |
| 2017/0141766 | A1 | 5/2017 | Kao et al. |

\* cited by examiner

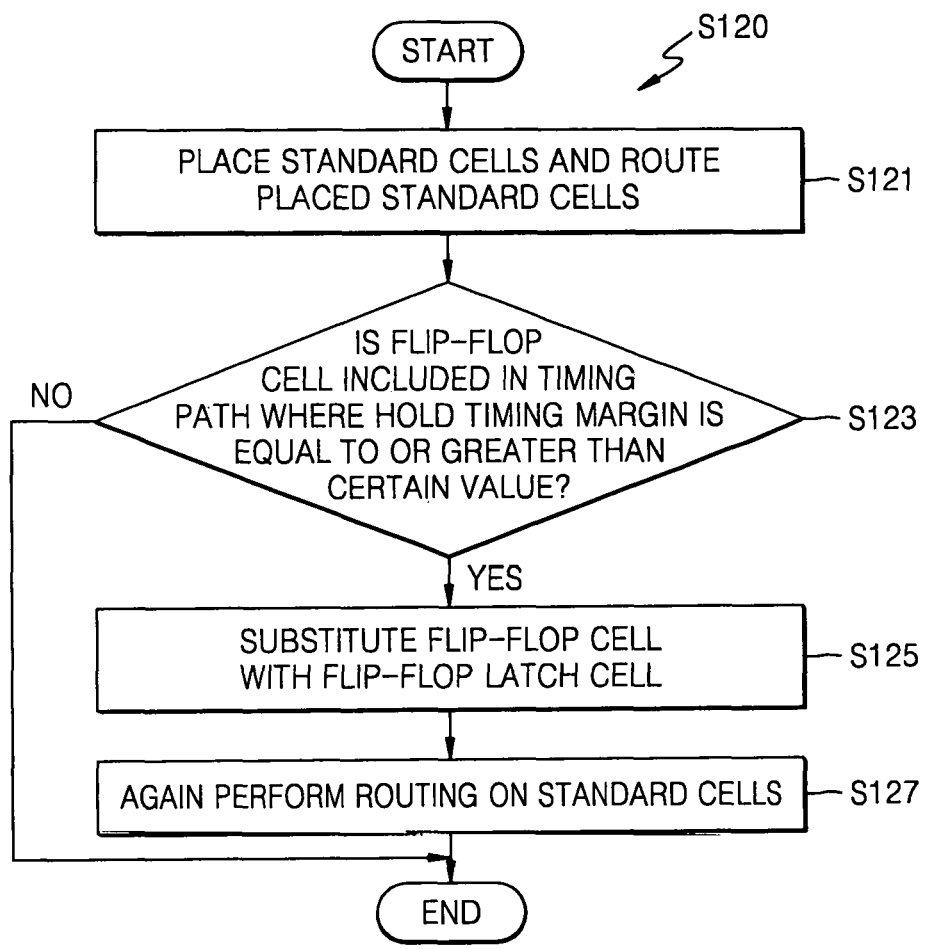
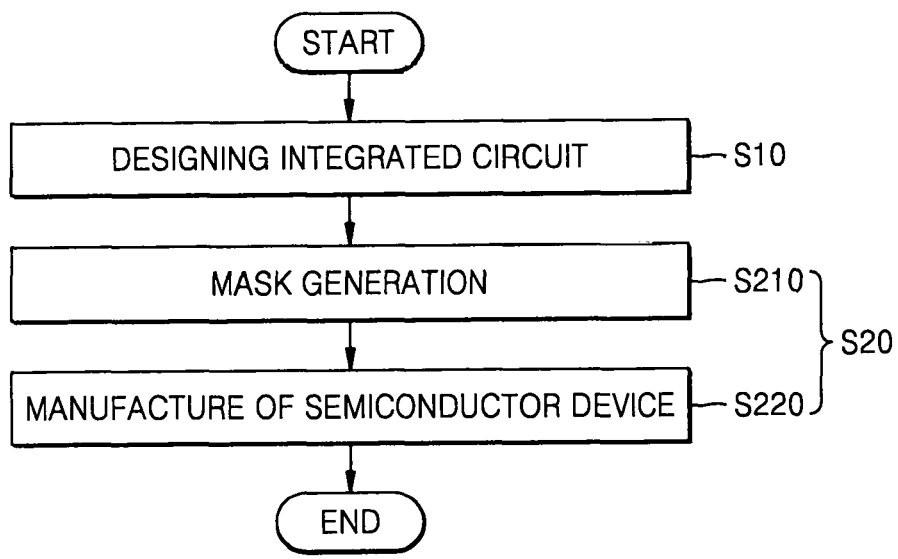

STANDARD CELL LIBRARY, INTEGRATED CIRCUIT INCLUDING SYNCHRONOUS CIRCUIT, AND COMPUTING SYSTEM FOR DESIGNING THE INTEGRATED CIRCUIT

CROSS-REFERENCE TO RELATED APPLICATIONS

This application claims the benefit of Korean Patent Application Nos. 10-2017-0104520, filed on Aug. 18, 2017 and 10-2018-0033490, filed on Mar. 22, 2018, in the Korean Intellectual Property Office, the disclosures of which are incorporated herein in their entirety by reference.

BACKGROUND

1. Technical Field

Example embodiments of the inventive concepts relate to non-transitory computer readable medium storing a standard cell library, an integrated circuit (IC) including a synchronous circuit, and a computing system for designing the IC. For example, at least some example embodiments relate to non-transitory computer readable medium storing a standard cell library including a standard cell corresponding to a synchronous circuit, an IC including the synchronous circuit, and a computing system for designing the IC.

2. Discussion of the Related Art

As semiconductor chips are integrated, time and resources may be expended in testing semiconductor chips. Design for testability (DFT) technology is being widely used for maintaining the quality of semiconductor chips and enhancing test efficiency.

SUMMARY

Example embodiments of the inventive concepts provide a non-transitory computer readable medium storing a standard cell library including a standard cell corresponding to a synchronous circuit which operates as a flip-flop or a latch depending on a mode, an integrated circuit (IC) including the synchronous circuit, and a computing system for designing the IC.

According to an example embodiment of the inventive concepts, there is provided an IC including a first synchronous circuit configured to operate in synchronization with a clock signal, the first synchronous circuit including a selector including a first input terminal, a second input terminal and a third input terminal, the first input terminal configured to receive a first input signal, the second input terminal configured to receive a second input signal, and the third input terminal configured to receive a scan enable signal, the scan enable signal instructing the first synchronous circuit to operate in one of a scan test mode and a function operation mode; and a reconfigurable latch configured to selectively switch between operating as a flip-flop in the scan test mode and operating as a latch in the function operation mode such that, in the scan test mode the reconfigurable latch outputs a first output signal corresponding to the first input signal and in the function operation mode the reconfigurable latch outputs a second output signal corresponding to the second input signal.

According to another example embodiment of the inventive concepts, there is provided a non-transitory computer readable medium storing a standard cell library which includes information about a plurality of standard cells, which when executed by a processor, configures the processor to, design an integrated circuit including a synchronous circuit which operates in synchronization with a clock signal, the synchronous circuit including, a reconfigurable latch configured to selectively switch, in response to a scan enable signal, between operating as a flip-flop in a scan test mode and operating as a latch in a function operation mode such that, in the scan test mode the reconfigurable latch outputs a first output signal corresponding to a first input signal and in the function operation mode the reconfigurable latch outputs a second output signal corresponding to a second input signal.

According to another example embodiment of the inventive concepts, there is provided a computing system including a storage device configured to store a standard cell library including information about a plurality of standard cells including a plurality of flip-flop latch cells and a plurality of flip-flop cells; and a processor configured to design an integrated circuit (IC) including a scan test circuit having a plurality of synchronous circuits configured to operate in synchronization with a clock signal such that at least one of the plurality of synchronous circuits includes, a reconfigurable latch formed using the plurality of standard cells, the reconfigurable latch configured to operate as a flip-flop in a scan test mode in response to a scan enable signal having a first logic level, and to operate as a latch in a function operation mode in response to the scan enable signal having a second logic level.

BRIEF DESCRIPTION OF THE DRAWINGS

Example embodiments of the inventive concepts will be more clearly understood from the following detailed description taken in conjunction with the accompanying drawings in which:

FIG. 12 is a flowchart for describing an example embodiment of operation S120 of FIG. 10; and FIG. 13 is a flowchart for describing a method of manufacturing an IC, according to an example embodiment.

DETAILED DESCRIPTION

Hereinafter, example embodiments will be described in detail with reference to the accompanying drawings.

Figure 1:
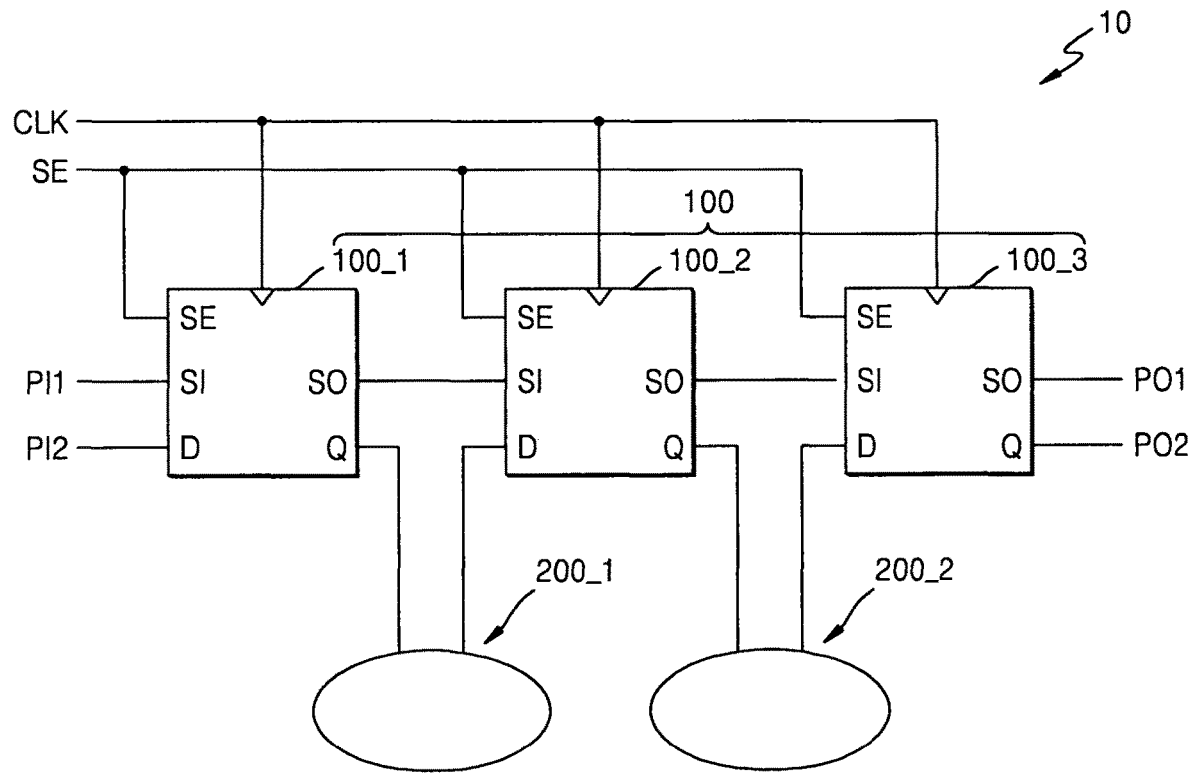
FIG. 1 is a block diagram illustrating an IC including a synchronous circuit, according to an example embodiment.

FIG. 1 is a block diagram illustrating an integrated circuit (IC) 10 including a synchronous circuit, according to an example embodiment.

Referring to FIG. 1, the IC 10 may include a plurality of synchronous circuits 100. The plurality of synchronous circuits 100 may configure a sequential circuit and may configure a scan chain which operates as a scan test circuit.

The plurality of synchronous circuits 100 may each include a first terminal SI, which receives a scan input signal, and a second terminal D, which receives a data input signal. Also, each of the plurality of synchronous circuits 100 may output a scan output signal SO based on the scan input signal and may output a data output signal Q based on the data input signal.

A plurality of combinational logic circuits, for example, first and second combinational logic circuits 200_1 and 200_2, may each be implemented as synchronous or asynchronous circuits. The plurality of combinational logic circuits 200_1 and 200_2 may process a data signal input thereto and may output a result obtained through the processing.

A first synchronous circuit 100_1 may provide a scan input signal PI1 as the scan output signal SO in a scan test mode (for example, a mode where a scan enable signal SE has a logic high level) in synchronization with a clock signal CLK, and in a function operation mode (for example, a mode where the scan enable signal SE has a logic low level), the first synchronous circuit 100_1 may provide a data input signal PI2 as the data output signal Q.

The first combinational logic circuit 200_1 may perform an arithmetical operation on a data output signal Q of the first synchronous circuit 100_1 to provide a data input signal D of a second synchronous circuit 100_2. Also, the second synchronous circuit 100_2 may receive a scan output signal SO of the first synchronous circuit 100_1 as the scan input signal SI. Also, the second synchronous circuit 100_2 may operate in the function operation mode or a scan test mode, based on the scan enable signal SE and the clock signal CLK.

The second combinational logic circuit 200_2 may perform an arithmetical operation on a data output signal Q of the second synchronous circuit 100_2 to provide a data input signal D of a third synchronous circuit 100_3. Also, the third synchronous circuit 100_3 may receive a scan output signal SO of the second synchronous circuit 100_2 as the scan input signal SI. Also, the third synchronous circuit 100_3 may operate in the function operation mode or the scan test mode, based on the scan enable signal SE and the clock signal CLK. The third synchronous circuit 100_3 may output a data output signal PO2 in the function operation mode, and in the scan test mode, the third synchronous circuit 100_3 may output a scan output signal PO1.

In the drawing, an example where three synchronous circuits configure a sequential circuit is illustrated, but the IC 10 according to the present example embodiments is not limited thereto. The number of synchronous circuits included in the IC 10 may vary.

At least one of the plurality of synchronous circuits 100 may be implemented as one of the synchronous circuits of FIGS. 2 to 6. At least one of the plurality of synchronous circuits 100 may operate as a latch in the function operation mode, and as a flip-flop in the scan test mode. Therefore, in the at least one synchronous circuit, an operation speed is enhanced and power consumption is reduced in a function operation, and moreover, an additional hold buffer may be omitted in a scan test operation. Accordingly, a total area of the IC 10 is reduced, and power consumption of the IC 10 is reduced.

Figure 2:
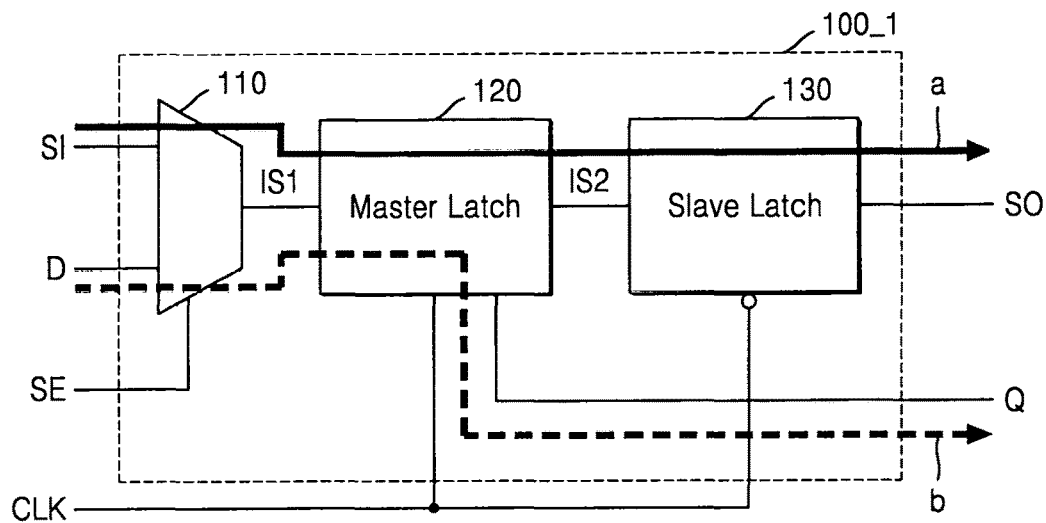
FIG. 2 is a block diagram illustrating a first synchronous circuit according to an example embodiment.

FIG. 2 is a block diagram illustrating the first synchronous circuit 100_1 according to an example embodiment. The first synchronous circuit 100_1 of FIG. 2 may be at least one of the plurality of synchronous circuits 100 included in the IC 10 of FIG. 1, and for example, may be the first synchronous circuit 100_1, but is not limited thereto. A scan input signal SI of FIG. 2 may be the scan input signal PI1 of FIG. 1, and a data input signal D of FIG. 2 may be the data input signal PI2 of FIG. 1.

Referring to FIG. 2, the first synchronous circuit 100_1 may include a multiplexer 110, a master latch 120, and a slave latch 130. The first synchronous circuit 100_1 may operate as a flip-flop or a latch, based on an operation mode.

The multiplexer 110 may receive a data input signal D and a scan input signal SI, and based on an operation mode, the multiplexer 110 may select one signal from among the data input signal D and the scan input signal SI to provide a first internal signal IS1 obtained through the selection. The multiplexer 110 may provide the data input signal D as the first internal signal IS1 in a function operation mode b of transferring data, and in a scan test mode a of performing a test operation, the multiplexer 110 may provide the scan input signal SI as the first internal signal IS1. The multiplexer 110 may be referred to as a mux, a scan mux, or a selector.

The multiplexer 110 may include a first input terminal which receives the scan input signal SI, a second input terminal which receives the data input signal D, and a third input terminal which receives a scan enable signal SE.

In an example embodiment, an operation mode may be determined based on a logic level of the scan enable signal SE received by the first synchronous circuit 100_1. For example, if the scan enable signal SE has a first logic level (for example, a logic high level), the scan test mode a may be performed, and if the scan enable signal SE has a second logic level (for example, a logic low level), the function operation mode b may be performed. However, the first synchronous circuit 100_1 according to the present example embodiments is not limited thereto. In other example embodiments, if the scan enable signal SE has the second logic level, the scan test mode a may be performed, and if the scan enable signal SE has the first logic level, the function operation mode b may be performed.

The master latch 120 may latch the first internal signal IS1 output from the multiplexer 110 to output a second internal signal IS2, based on the clock signal CLK. The slave latch 130 may latch the second internal signal IS2 output from the master latch 120, based on an inversion clock signal obtained by inverting the clock signal CLK.

In the scan test mode a, the multiplexer 110 may provide the scan input signal SI to the master latch 120. The first internal signal IS1 may be the scan input signal SI. The master latch 120 may latch the scan input signal SI, and the slave latch 130 may latch the second internal signal IS2 to output a scan output signal SO.

In the scan test mode a, the master latch 120 and the slave latch 130 may all operate to configure one flip-flop. The master latch 120 and the slave latch 130 may perform a scan operation of latching the scan input signal SI to provide the scan output signal SO.

The scan output signal SO may be provided as a scan input signal of a next synchronous circuit (for example, the second synchronous circuit 100_2 of FIG. 1) connected to the first synchronous circuit 100_1, and the next synchronous circuit may perform an operation similar to an operation of the first synchronous circuit 100_1 in the scan test mode a.

On the other hand, in the function operation mode b, the multiplexer 110 may provide the data input signal D to the master latch 120. The first internal signal IS1 may be the data input signal D. The master latch 120 may perform a function operation of latching the data input signal D to provide a data output signal Q. In the function operation mode b, the slave latch 130 may not be used.

The first synchronous circuit 100_1 according to an example embodiment may output the scan output signal SO and the data output signal Q through different nodes. The scan output signal SO may be output from the slave latch 130, and the data output signal Q may be output from the master latch 120. Therefore, in the scan test mode a, the first synchronous circuit 100_1 may operate as the flip-flop where both of the master latch 120 and the slave latch 130 operate. On the other hand, in the function operation mode b, since the slave latch 130 does not operate, the first synchronous circuit 100_1 may operate as a latch.

In a case where a synchronous circuit operates as a latch, a delay time is shorter than that of a flip-flop, and power consumption is smaller than that of a flip-flop, whereby the case is efficient when performing the function operation mode. However, if the synchronous circuit were to also operate as the latch when performing the scan test mode, a separate hold buffer may be additionally needed between the synchronous circuit and another synchronous circuit so that a scan shift operation is stably performed in the scan test mode, which may cause an area of an IC and power consumption of the IC to increase.

In contrast, since the first synchronous circuit 100_1 according to an example embodiment operates as a latch in the function operation mode b and operates as a flip-flop in the scan test mode a, an operation speed is enhanced and power consumption is reduced in the function operation, and in the scan test operation, an additional hold buffer may not be needed. Accordingly, a total area of an IC is reduced, and moreover, power consumption of the IC is reduced.

In an example embodiment, the slave latch 130 may include a plurality of transistors each having a threshold voltage which is higher than those of a plurality of transistors included in the master latch 120. The slave latch 130 may be implemented with transistors each having a high threshold voltage, and thus, in the scan test mode a, a leakage current of the slave latch 130 is reduced, and an operation speed of the flip-flop including the master latch 120 and the slave latch 130 is reduced. Accordingly, a problem where a hold time is violated in the scan test mode a is solved.

Figure 3A:
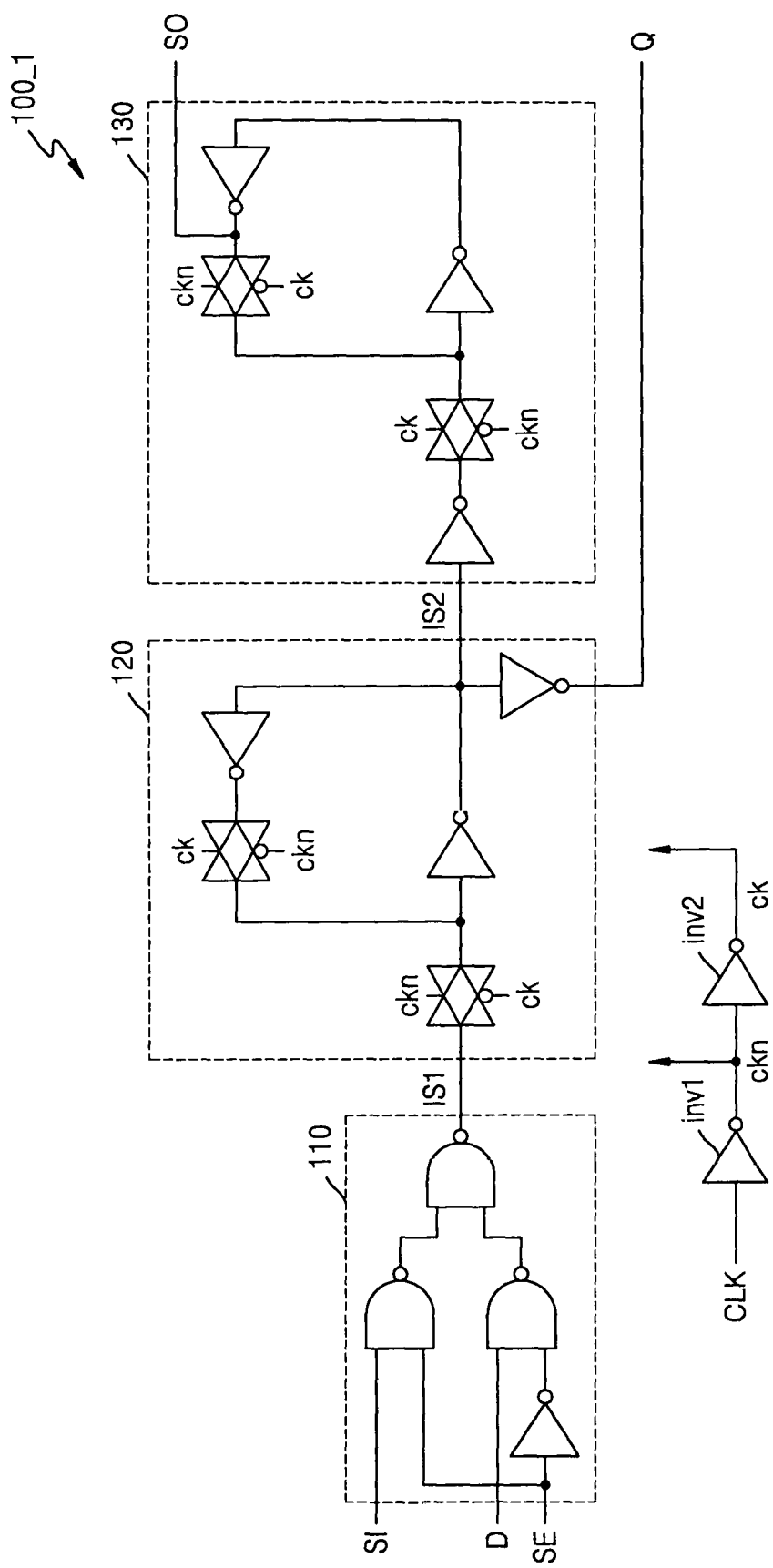
FIGS. 3A and 3B are logic diagrams according to an example embodiment of each of a master latch and a slave latch included in the first synchronous circuit of FIG. 2.
Figure 3B:
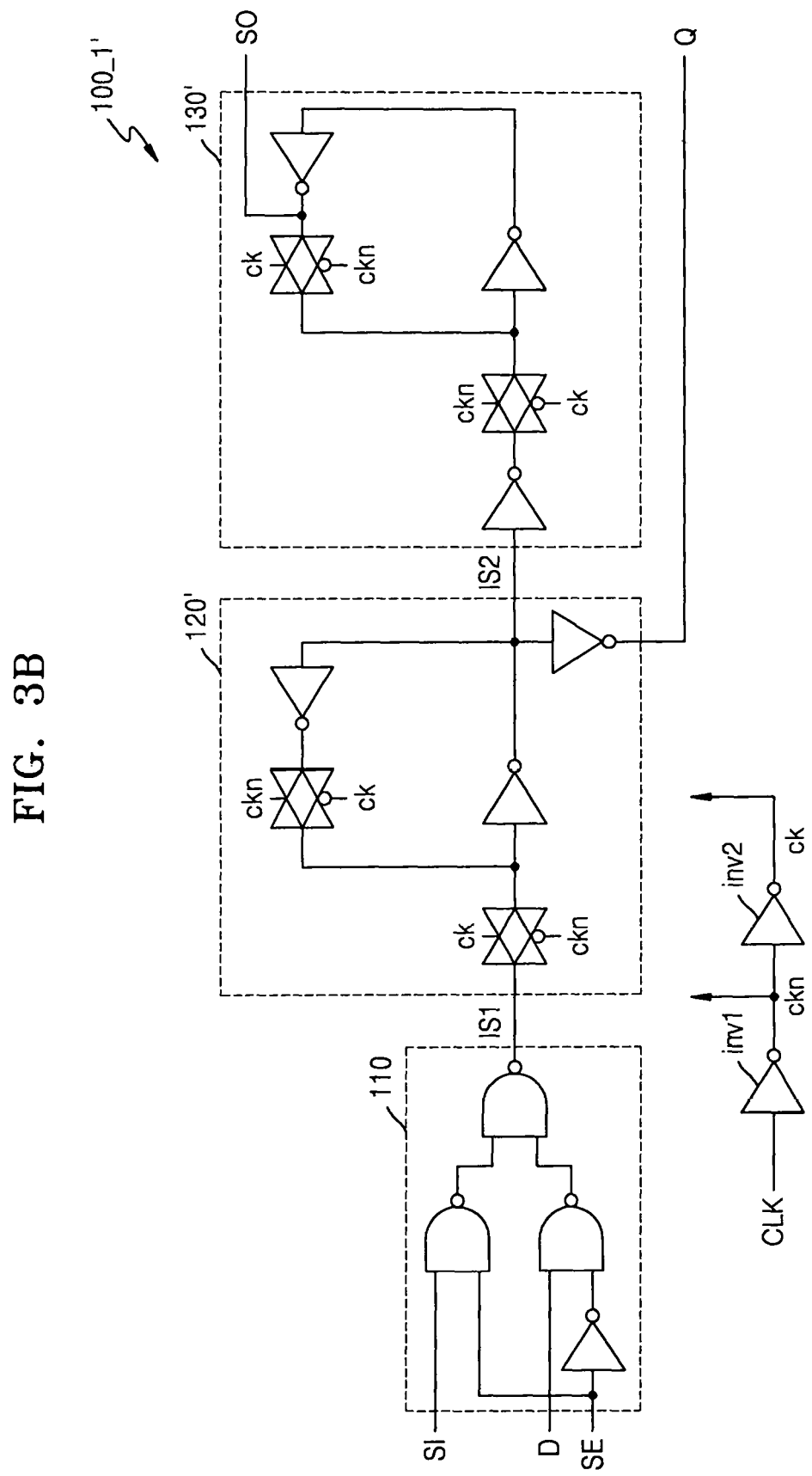

FIGS. 3A and 3B are logic diagrams according to an example embodiment of each of the master latch and the slave latch included in the first synchronous circuit 100_1 of FIG. 2.

Referring to FIG. 3A, the first synchronous circuit 100_1 may include the multiplexer 110, the master latch 120, and the slave latch 130. In an example embodiment, the multiplexer 110 may include three NAND gates and one inverter. However, this is merely an example, and the multiplexer 110 may be implemented as various types.

The master latch 120 and the slave latch 130 may each include two transmission gates and three inverters. The logic gates may be connected to one another as illustrated in FIG. 3A. However, the master latch 120 and the slave latch 130 illustrated in FIG. 3A are examples, and the present example embodiments are not limited thereto. The number of transmission gates and inverters included in each of the master latch 120 and the slave latch 130 may vary based on a design.

The first synchronous circuit 100_1 may include a plurality of inverters inv1 and inv2 which respectively generate an inversion clock signal ckn and an internal clock signal ck, based on a clock signal CLK received from the outside. The plurality of inverters inv1 and inv2 are illustrated as being provided outside the master latch 120 and the slave latch 130, but are not limited thereto. In other example embodiments, the plurality of inverters inv1 and inv2 may be included in at least one of the master latch 120 and the slave latch 130.

The master latch 120 may be an active high latch. Therefore, the master latch 120 may transparently output the data input signal D, output from the multiplexer 110, as the data output signal Q in a logic high period which is an enable period of the internal clock signal ck.

The master latch 120 and the slave latch 130 may configure one flip-flop, and the flip-flop may operate as a negative edge flip-flop. Therefore, the slave latch 130 may output the scan output signal SO at a negative edge of the internal clock signal ck or a positive edge of the inversion clock signal ckn.

Referring to FIG. 3B, a master latch 120' and a slave latch 130' may each include two transmission gates and three inverters. The logic gates may be connected to one another as illustrated in FIG. 3B. However, the master latch 120' and the slave latch 130' illustrated in FIG. 3B are examples, and the present example embodiments are not limited thereto.

A first synchronous circuit 100_1' may include a plurality of inverters inv1 and inv2 which respectively generate an inversion clock signal ckn and an internal clock signal ck, based on a clock signal CLK received from the outside. The plurality of inverters inv1 and inv2 are illustrated as being provided outside the master latch 120' and the slave latch 130', but are not limited thereto. In other embodiments, the plurality of inverters inv1 and inv2 may be included in at least one of the master latch 120' and the slave latch 130'.

The master latch 120' may be an active low latch. The master latch 120' may transparently output a data input signal D, output from a multiplexer 110, as a data output signal Q in a disable period of the internal clock signal ck, namely, a logic low period.

The master latch 120' and the slave latch 130' may configure one flip-flop, and the flip-flop may operate as a positive edge flip-flop. Therefore, the slave latch 130' may output a scan output signal SO at a positive edge of the internal clock signal ck, namely, a negative edge of the inversion clock signal ckn.

Figure 4:
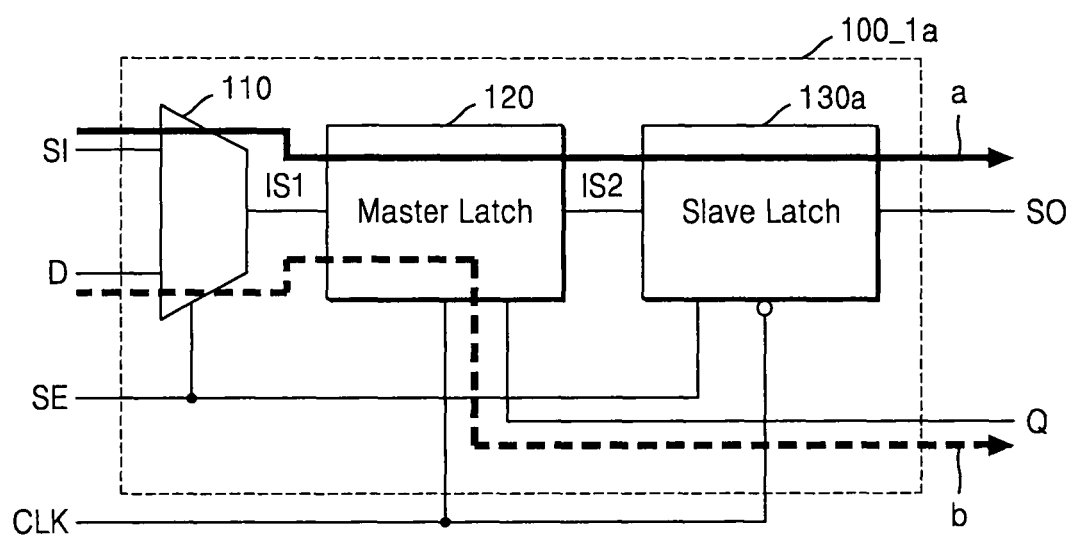
FIG. 4 is a block diagram illustrating a first synchronous circuit according to an example embodiment.

FIG. 4 is a block diagram illustrating a first synchronous circuit 100_1a according to an example embodiment. The first synchronous circuit 100_1a of FIG. 4 may be at least one of the plurality of synchronous circuits 100 included in the IC 10 of FIG. 1, and for example, may be the first synchronous circuit 100_1, but is not limited thereto. In FIG. 4, descriptions of elements which are the same as the elements of FIG. 2 are not repeated.

Referring to FIG. 4, the first synchronous circuit 100_1a may include a multiplexer 110, a master latch 120, and a slave latch 130a. The first synchronous circuit 100_1a may operate as a flip-flop in a scan test mode a, and in a function operation mode b, the first synchronous circuit 100_1a may operate as a latch.

The slave latch 130a may latch a second internal signal IS2 output from the master latch 120, based on an inversion clock signal obtained by inverting the clock signal CLK. At this time, the slave latch 130a may receive a scan enable signal SE, and in response to the scan enable signal SE, the slave latch 130a may determine whether to perform a latch operation of the slave latch 130a. The slave latch 130a may perform a latch operation in a scan test mode a, and in a function operation mode b, the slave latch 130a may not perform the latch operation.

For example, if the scan enable signal SE has a first logic level (for example, a logic high level), the slave latch 130a may perform the latch operation, and if the scan enable signal SE has a second logic level (for example, a logic low level), the slave latch 130a may not perform the latch operation.

In an example embodiment, the slave latch 130a may include a plurality of transistors each having a threshold voltage which is higher than those of a plurality of transistors included in the master latch 120. The slave latch 130a may be implemented with transistors each having a high threshold voltage, and thus, in the scan test mode a, a leakage current of the slave latch 130a is reduced, and an operation speed of the first synchronous circuit 100_1a is reduced. Accordingly, a problem where a hold time is violated in the scan test mode a is solved.

In the function operation mode b, since only the master latch 120 is used, the slave latch 130a may not perform the latch operation, and thus, the power consumption of the first synchronous circuit 100_1a is reduced. Also, the slave latch 130a does not operate, and thus, even when the threshold voltages of the transistors included in the slave latch 130a are relatively high, the operation speed of the first synchronous circuit 100_1a is not reduced.

Figure 5:
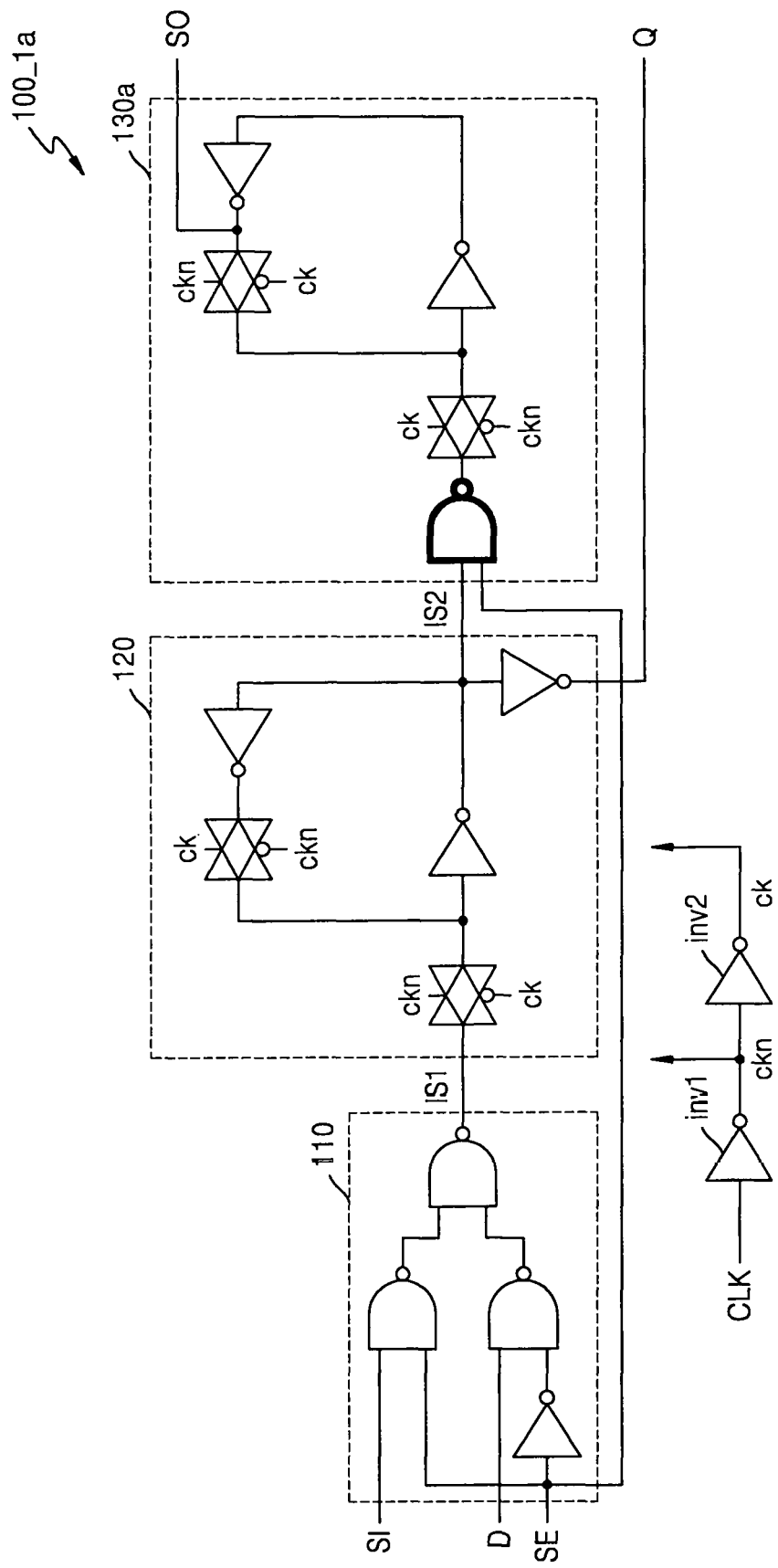
FIG. 5 is a logic diagram according to an example embodiment of each of a master latch and a slave latch included in the first synchronous circuit of FIG. 4.

FIG. 5 is a logic diagram according to an example embodiment of each of the master latch and the slave latch included in the first synchronous circuit of FIG. 4. In FIG. 5, descriptions of elements which are the same as the elements of FIG. 3A are not repeated.

Referring to FIG. 5, the first synchronous circuit 100_1a may operate as a positive edge flip-flop in the scan test mode, and in the function operation mode, the first synchronous circuit 100_1a may operate as an active low latch.

In an example embodiment, the slave latch 130a may include two transmission gates, two inverters, and one NAND gates. The logic gates may be connected to one another as illustrated in FIG. 5. However, the master latch 120 and the slave latch 130a illustrated in FIG. 5 are an example, and the present example embodiments are not limited thereto.

The NAND gate may perform a NAND operation on the scan enable signal SE and the second internal signal IS2 which is output from the master latch 120. For example, if the scan enable signal SE has a logic low level (the function operation mode), the scan output signal SO may be fixed to a logic high level regardless of the data input signal D and the clock signal CLK. That is, in the function operation mode, the scan output signal SO may be fixed to a logic high level. Therefore, the power consumption of the slave latch 130a is reduced.

The NAND operation of the NAND gate being performed in a process where the slave latch 130a controls whether to perform a latch operation on the second internal signal IS2 based on the scan enable signal SE is one example embodiment. The slave latch 130a may include a NOR gate instead of the NAND gate, and the NOR gate may receive an inverted signal of the scan enable signal SE and the second internal signal IS2 to perform a NOR operation. For example, if the scan enable signal SE has a logic low level (the function operation mode), the scan output signal SO may be fixed to a logic high level regardless of the data input signal D and the clock signal CLK.

In the slave latch 130a of the first synchronous circuit 100_1a according to the present example embodiment, an input of the second internal signal IS2 output from the master latch 120 may be blocked, based on the scan enable signal SE, and an operation of blocking the input of the second internal signal IS2 may be implemented in various manners.

In FIG. 5, an example where the master latch 120 is an active high latch and the master latch 120 and the slave latch 130a configure one negative edge flip-flop is illustrated, but the first synchronous circuit 100_1a according to the present example embodiments is not limited thereto. Even in a case where the master latch 120 is an active low latch and the master latch 120 and the slave latch 130a configure one positive edge flip-flop, the slave latch 130a may be configured so that the input of the second internal signal IS2 is blocked inside the slave latch 130a, based on the scan enable signal SE.

The first synchronous circuit 100_1a according to the present example embodiments is not limited to an example where in the function operation mode, a latch operation of the slave latch 130a is controlled by blocking the input of the second internal signal IS2 output from the master latch 120. In other example embodiments, the first synchronous circuit 100_1a may be configured to block the clock signal CLK received by the slave latch 130a in response to the scan enable signal SE. For example, the slave latch 130a may be configured so that if the scan enable signal SE has a logic low level (the function operation mode), an internal clock signal ck and an inversion clock signal ckn are not input to a transmission gate.

Figure 6:
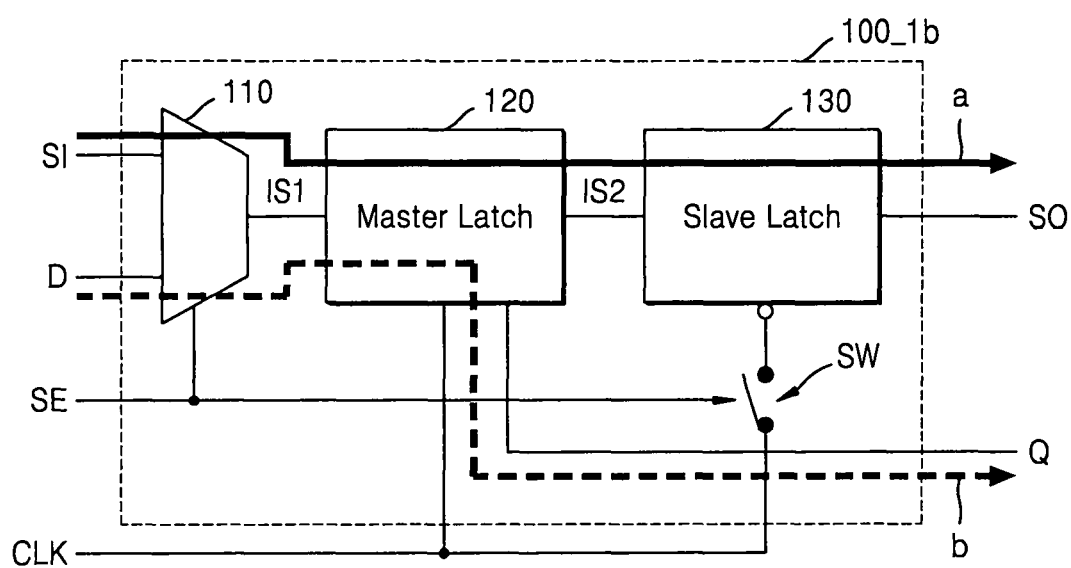
FIG. 6 is a block diagram illustrating a first synchronous circuit according to an example embodiment.

FIG. 6 is a block diagram illustrating a first synchronous circuit 100_1b according to an example embodiment. The first synchronous circuit 100_1b of FIG. 6 may be at least one of the plurality of synchronous circuits 100 included in the IC 10 of FIG. 1, and for example, may be the first synchronous circuit 100_1, but is not limited thereto. In FIG. 6, descriptions of elements which are the same as the elements of FIG. 2 are not repeated.

Referring to FIG. 6, the first synchronous circuit 100_1b may include a multiplexer 110, a master latch 120, a slave latch 130, and a switch SW. The first synchronous circuit 100_1b may operate as a flip-flop in a scan test mode a, and in a function operation mode b, the first synchronous circuit 100_1b may operate as a latch.

In response to the scan enable signal SE, the switch SW may block a clock signal CLK input to the slave latch 130. Therefore, whether to perform a latch operation of the slave latch 130 may be determined based on the scan enable signal SE. The switch SW may be implemented as various types.

For example, if the scan enable signal SE has a first logic level (for example, a logic high level), the clock signal CLK may be input to the slave latch 130, and if the scan enable signal SE has a second logic level (for example, a logic low level), the clock signal CLK may not be input to the slave latch 130. Therefore, the slave latch 130 may perform the latch operation in a scan test mode a, and in a function operation mode b, the slave latch 130 may not perform the latch operation.

In FIG. 6, a configuration where the clock signal CLK input from the outside of the slave latch 130 to the inside of the slave latch 130 is blocked is described, but the first synchronous circuit 100_1b according to the present embodiment is not limited thereto. The first synchronous circuit 100_1b may further include a switch SW which blocks a second internal signal IS2 input from the outside of the slave latch 130 to the inside of the slave latch 130. For example, the switch may be configured so that if the scan enable signal SE has a logic high level (a scan test mode a), the second internal signal IS2 is input to the slave latch 130, and if the scan enable signal SE has a logic low level (a function operation mode b), the second internal signal IS2 is not input to the slave latch 130.

In the function operation mode b, since only the master latch 120 is used, the slave latch 130 may not perform the latch operation, and thus, the power consumption of the first synchronous circuit 100_1b is reduced. Also, the slave latch 130 does not operate, and thus, even when threshold voltages of transistors included in the slave latch 130 are relatively high, an operation speed of the first synchronous circuit 100_1b is not reduced.

Figure 7:
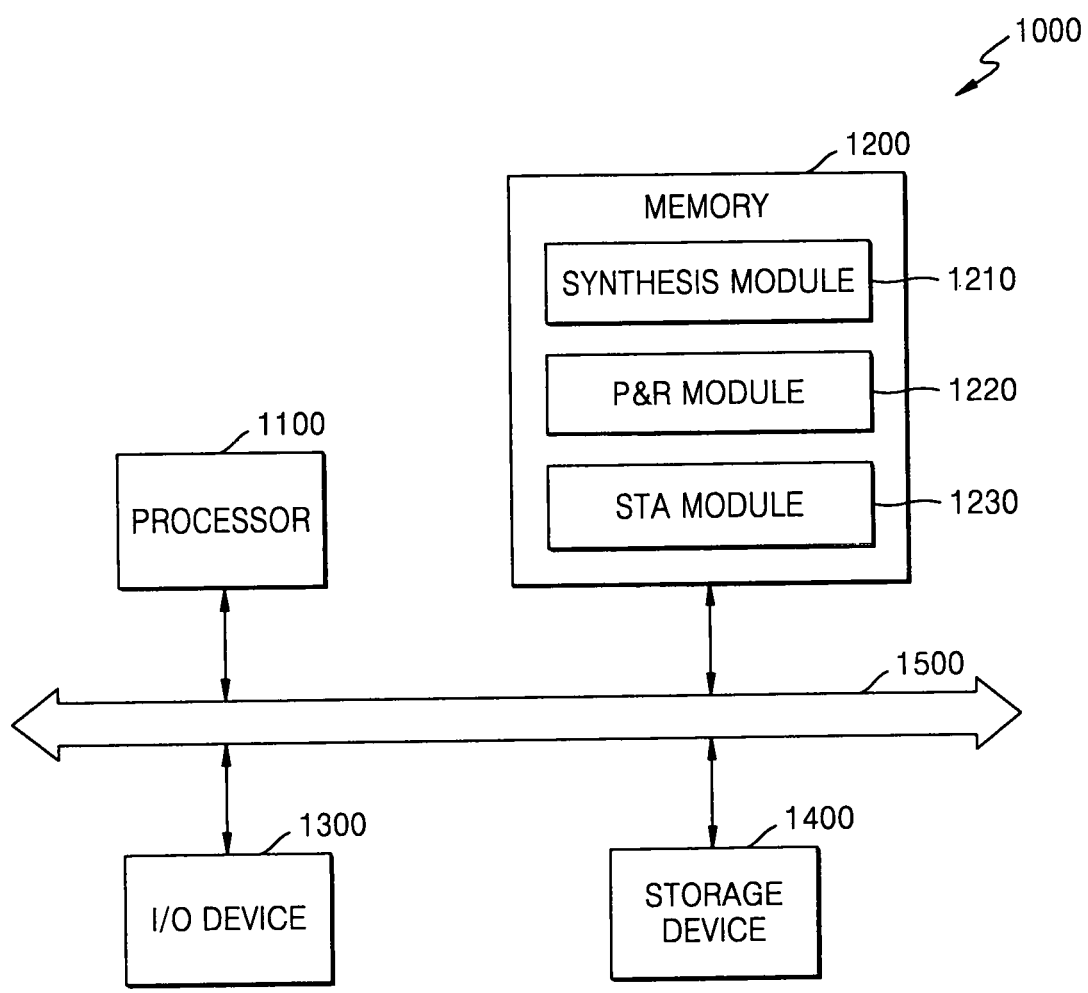
FIG. 7 is a block diagram illustrating a computing system for designing an IC, according to an example embodiment.

FIG. 7 is a block diagram illustrating a computing system 1000 for designing an IC, according to an example embodiment.

Referring to FIG. 7, the computing system (hereinafter referred to as an IC designing system) 1000 for designing an IC may include a processor 1100, a memory 1200, an input/output (I/O) device 1300, a storage device 1400, and a bus 1500. In an example embodiment, the IC designing system 1000 may be implemented with an integrated device, and thus, may be an IC designing device. The IC designing system 1000 may be provided as a dedicated device for designing an IC of a semiconductor device, but may be a computer for driving various simulation tools or design tools.

The computing system 1000 may design the IC 10 of FIG. 1, and thus, design an IC including one of the first synchronous circuits 100_1, 100_1', 100_1a, and 100_1b of FIGS. 2, 3A, 3B, 4, 5, and 6.

The processor 1100 may include processing circuitry including, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processor 1100 may be configured, through a layout design or execution of computer readable instructions stored in the memory 1200, as a special purpose computer to perform at least one of various operations of designing the IC.

The processor 1100 may communicate with the memory 1200, the I/O device 1300, and the storage device 1400 through the bus 1500. The processor 1100 may drive a synthesis module 1210, a placement and routing (P&R) module 1220, and a static timing analysis (STA) module 1230 which are loaded into the memory 1200, thereby performing an operation of designing the IC. An operation of the processor 1100 executing the code stored in each of the modules will be described below with reference to FIG. 10.

The memory 1200 may store the synthesis module 1210, the P&R module 1220, and the STA module 1230. The synthesis module 1210, the P&R module 1220, and the STA module 1230 may be loaded from the storage device 1400 into the memory 1200.

The synthesis module 1210 may be a program which includes a plurality of instructions for performing a logic synthesis operation and a Design for testability (DFT) logic insertion operation. The P&R module 1220 may be a program which includes a plurality of instructions for performing a P&R operation. The STA module 1230 may be a program which includes a plurality of instructions for performing an STA operation.

The memory 1200 may be a volatile memory such as static random access memory (SRAM) or dynamic random access memory (DRAM), or may be a non-volatile memory such as phase-change random access memory (PRAM), magnetoresistive random access memory (MRAM), resistive random access memory (ReRAM), ferroelectric random access memory (FRAM), or NOR flash memory.

The I/O device 1300 may control a user input and an output performed through user interface devices. For example, the I/O device 1300 may include one or more input devices such as a keyboard, a mouse device, and a touch pad and may receive input data which defines the IC. For example, the I/O device 1300 may include output devices such as a display and a speaker and may display a placement result, a routing result, an STA result, etc.

The storage device 1400 may store various pieces of data associated with the synthesis module 1210, the P&R module 1220, and the STA module 1230. The storage device 1400 may include a memory card (for example, multimedia card (MMC), an embedded multi-media card (eMMC), a secure digital (SD) card, a MicroSD card, etc.), a solid state drive (SSD), a hard disk drive (HDD), and/or the like.

Figure 8:
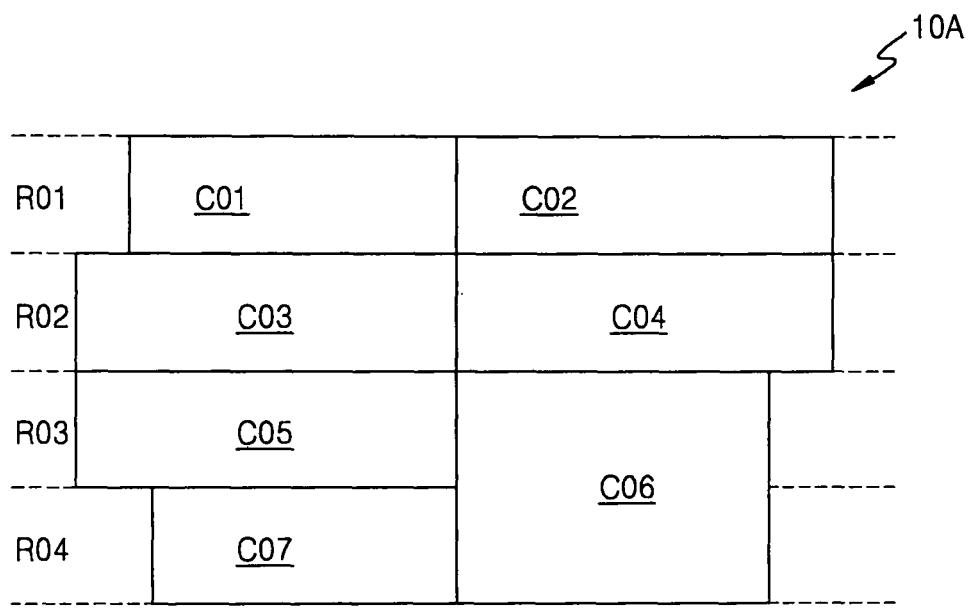
FIG. 8 illustrates a schematic layout of an IC according to an example embodiment.

FIG. 8 illustrates a schematic layout of an IC 10A according to an example embodiment. In FIG. 8, elements included in the IC 10A may not match a scale for convenience of description and may be exaggerated or reduced for clarity of illustration.

Referring to FIG. 8, the IC 10A may include instances C01 to C07 of standard cells. Instances corresponding to the same standard cell may have the same layout, and instances respectively corresponding to different standard cells may respectively have different layouts. The instances C01 to C07 may be sorted and placed in a plurality of rows R01 to R04. The instances C01 to C07 may each have a length H (i.e., a height) defined in a direction (i.e., a Y direction) vertical to the plurality of rows R01 to R04 extending in an X direction and may have the same length (i.e., a width) or different lengths (i.e., widths) in a direction (i.e., the X direction) parallel to the plurality of rows R01 to R04. The plurality of rows R01 to R04 where the instances C01 to C07 are sorted may each have a height matching a minimum height of a standard cell.

At least one of the instances C01 to C07 of standard cells placed in the IC 10A may be a synchronous circuit and may be one of the first synchronous circuits 100_1, 100_1', 100_1a, and 100_1b of FIGS. 2, 3A, 3B, 4, 5, and 6.

A standard cell included in the IC 10A may be selected from a standard cell library including information about a plurality of standard cells, based on a physical characteristic of the standard cell such as a function and a timing characteristic, and by placing an instance of the selected standard cell, a layout of the IC 10A may be generated. The standard cell library may include information (for example, function information and timing information about a standard cell and topological information about a layout) about various standard cells. The standard cell library according to an example embodiment may include a flip-flop cell group, a latch cell group, and a flip-flop latch cell group. The standard cell library will be described below with reference to FIG. 9.

Figure 9:
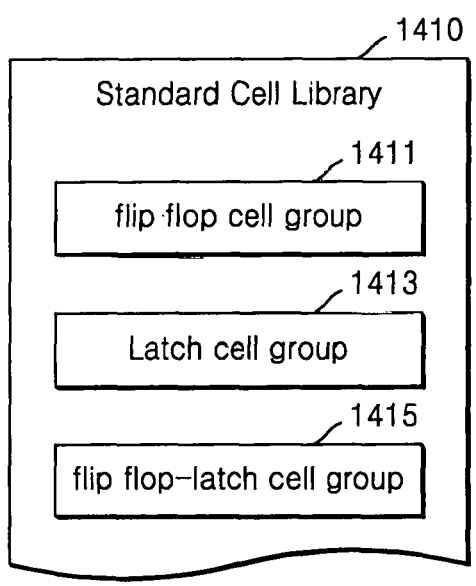
FIG. 9 is a diagram illustrating a cell library according to an example embodiment.

FIG. 9 is a diagram illustrating a standard cell library 1410 according to an example embodiment. The standard cell library 1410 may be stored in the storage device 1400 of FIG. 7.

Referring to FIG. 9, the standard cell library 1410 may include information about characteristics of a plurality of standard cells having different characteristics. For example, the standard cell library 1410 may include information about a power characteristic, a timing characteristic, or a shape characteristic of a standard cell.

The standard cell library 1410 may include a flip-flop cell group 1411, a latch cell group 1413, and a flip-flop latch cell group 1415. The flip-flop cell group 1411 may include information about flip-flop standard cells having different characteristics, and the latch cell group 1413 may include information about latch standard cells having different characteristics.

The flip-flop cell group 1411 may include information about a standard cell of a synchronous device which operates as a flip-flop regardless of a mode, and the latch cell group 1413 may include information about a standard cell of a synchronous device which operates as a latch regardless of a mode.

The flip-flop latch cell group 1415 may include information about a standard cell of a synchronous device which operates as a flip-flop or a latch depending on a mode. For example, the flip-flop latch cell group 1415 may include information about the first synchronous circuits 100_1, 100_1', 100_1a, and 100_1b of FIGS. 2, 3A, 3B, 4, 5, and 6.

According to an example embodiment, the computing system for designing an IC may generate layout data of an IC with reference to the standard cell library 1410.

Figure 10:
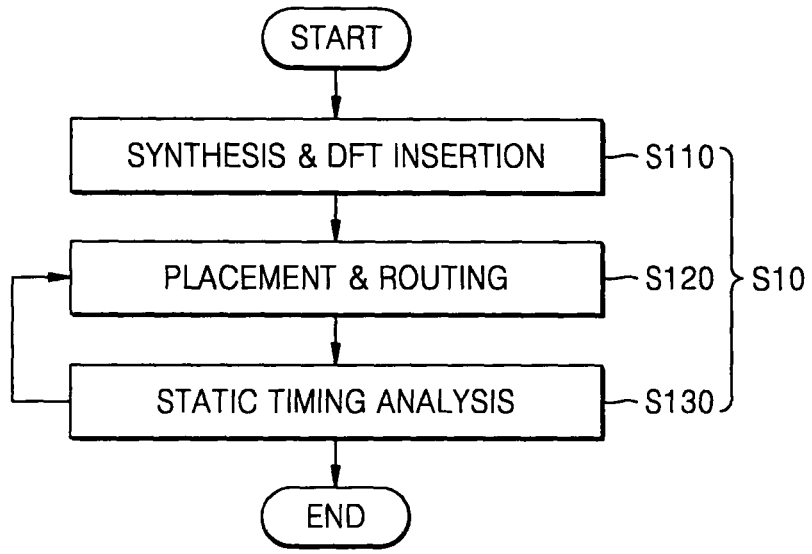
FIG. 10 is a flowchart illustrating a method of designing an IC, according to an example embodiment.
Figure 11:
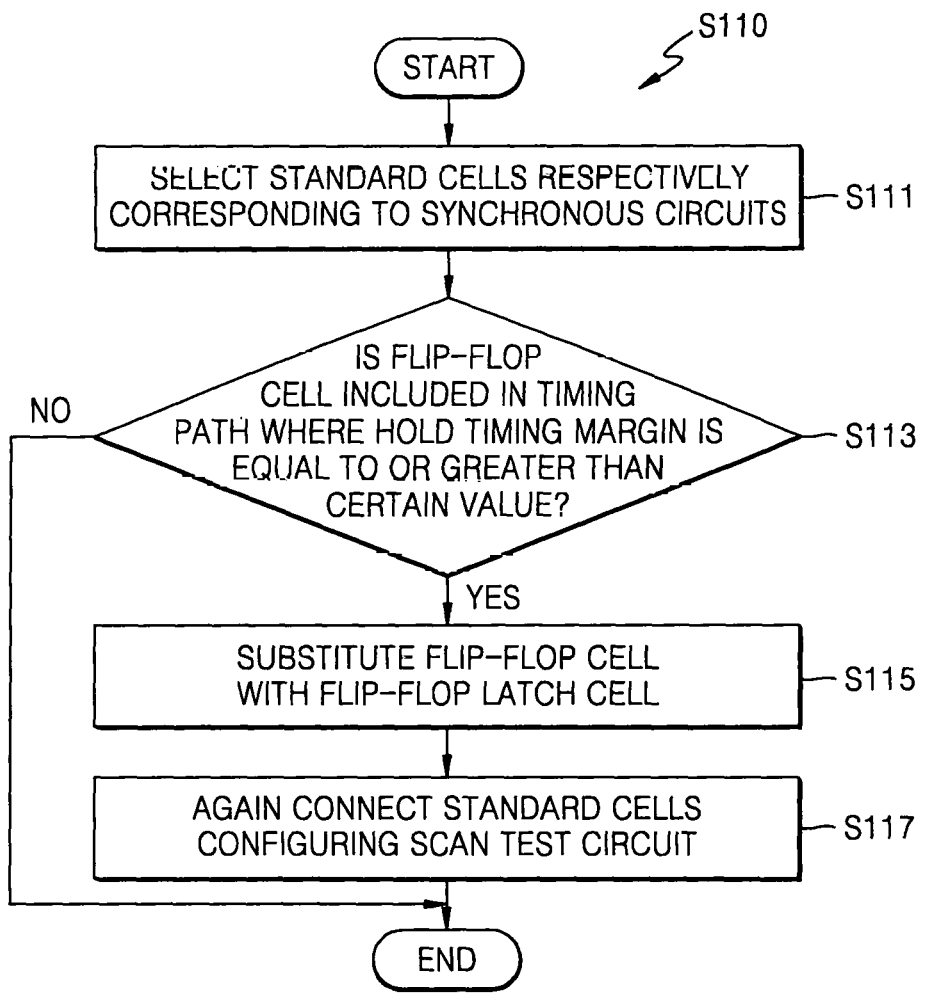
FIG. 11 is a flowchart for describing an example embodiment of operation S110 of FIG. 10.

FIG. 10 is a flowchart illustrating a method of designing an IC, according to an example embodiment. FIG. 11 is a flowchart for describing an example embodiment of operation S110 of FIG. 10. FIG. 12 is a flowchart for describing an example embodiment of operation S120 of FIG. 10.

Referring to FIGS. 7 and 10, the method of designing an IC may correspond to a process of designing a layout of an IC and may be performed by using a tool for designing the IC. In this case, the tool for designing the IC may be a software module or a program including a plurality of instructions executed by a processor and may be stored in a computer-readable storage medium. Therefore, the method of designing an IC may be referred to as a computer implementation method for designing an IC. The method of designing an IC illustrated in FIG. 10 may be performed by the computing system 1000 of FIG. 7. An IC designed by the design method may be the IC 10 of FIG. 1, and thus, may include one of the first synchronous circuits 100_1, 100_1', 100_1a, and 100_1b of FIGS. 2, 3A, 3B, 4, 5, and 6.

Referring to FIGS. 7, and 10, in operation S110, a synthesis operation may be performed by the processor 1100 by using the synthesis module 1210. "Synthesis" may be an operation of converting input data of an IC into hardware including a logic gate to generate a netlist and may be referred to as "logic synthesis". The input data may be an abstract type (for example, data defined in a register transfer level (RTL)) corresponding to an operation of an IC. The netlist may be generated from an RTL code by using a standard cell library and may be a netlist of a gate level. In an embodiment, the RTL code may be provided as an input file to a synthesis tool, and the netlist may be provided as an output file from the synthesis tool. The netlist may include a plurality of standard cells and information about a connection relationship of the standard cells.

Referring to FIG. 11, in performing the synthesis operation, the processor 1100 may perform operations S111 to S117.

In operation S111, the processor 1100 may execute the synthesis module 1210 to select a plurality of standard cells respectively corresponding to a plurality of synchronous circuits configuring a scan test circuit. At this time, the processor 1100 may execute the code included in the synthesis module 1210 to select the plurality of standard cells, based on input data and the standard cell library 1410 of FIG. 9.

In the function operation mode, the processor 1100 may select a flip-flop latch cell for a timing path where a hold timing margin is sufficient (for example, a case where the hold timing margin is equal to or greater than a certain value). That is, based on the standard cell library 1410 of FIG. 9, the processor 1100 may select and place the flip-flop latch cell in a case where a hold time is non-critical in the function operation mode.

In an example embodiment, in operation S113, the processor 1100 may determine whether a flip-flop cell of the selected standard cells is included in a timing path where the hold timing margin is equal to or greater than a certain value in the function operation mode.

In operation S115, the processor 1100 may substitute the flip-flop cell, included in the timing path where the hold timing margin is equal to or greater than the certain value, with the flip-flop latch cell, based on the standard cell library 1410 of FIG. 9. When the hold timing margin of the flip-flop cell in the function operation mode is equal to or greater than a length of an active period of when the flip-flop latch cell for substitution operates as a latch, the processor 1100 may determine that the hold timing margin is equal to or greater than the certain value and may determine that the hold time is non-critical.

In an example embodiment, the processor 1100 may execute the synthesis module 1210 to preferentially select flip-flop cells, and then, may substitute the flip-flop cell, selected for the timing path where the hold timing margin is sufficient in the function operation mode, with the flip-flop latch cell.

If the flip-flop cell is not included in the timing path where the hold timing margin is equal to or greater than the certain value, the processor 1100 may select the flip-flop cell as-is.

In a case of substituting the flip-flop cell with the flip-flop latch cell, in operation S117, the processor 1100 may again connect standard cells configuring a scan test circuit, based on a polarity of a clock signal. The synthesis module 1210 may insert a DFT logic, which is for connecting a plurality of synchronous circuits configuring the scan test circuit, into an IC.

In an example embodiment, a clock signal, which is applied to the flip-flop latch cell after substitution in the scan test mode, may have an inverted level with respect to a clock signal, which is applied to the flip-flop cell before substitution. That is, a polarity of the clock signal applied to the flip-flop latch cell may be opposite to that of the clock signal applied to the flip-flop cell.

For example, the first synchronous circuits 100_1 and 100_1a of FIGS. 3A and 5 may operate as an active high latch in the function operation mode and may operate as a negative edge flip-flop in the scan test mode, and thus, a polarity in the function operation mode may be opposite to a polarity in the scan test mode. Therefore, in a case where the flip-flop cell is substituted with the flip-flop latch cell corresponding to each of the first synchronous circuits 100_1 and 100_1a of FIGS. 3A and 5, the flip-flop latch cell may be again connected to other standard cells configuring the scan test circuit, based on a polarity of a clock signal. Such description may be applied to a flip-flop latch cell corresponding to the first synchronous circuit 100_1' of FIG. 3B.

Referring to FIGS. 7 and 10, in operation S120, by using the P&R module 1220, the processor 1100 may place and route standard cells which define an IC and may generate layout data of the IC. For example, the layout data may be data based on graphic design system (GDS) II. In an example embodiment, the netlist may be provided as an input file to the P&R module 1220, and the layout data may be output as an output file from the P&R module 1220.

Referring to FIG. 12, in performing the placement and routing operation, the processor 1100 may perform operations S121 to S127.

In operation S121, the processor 1100 may execute code included in the P&R module 1220 to place standard cells which define the scan test circuit and may route nets included in the placed standard cells.

In operation S123, the processor 1100 may determine whether a flip-flop cell of the selected standard cells is included in a timing path where a hold timing margin is equal to or greater than a certain value in the function operation mode.

In operation S125, the processor 1100 may substitute the flip-flop cell, included in the timing path where the hold timing margin is equal to or greater than the certain value, with a flip-flop latch cell, based on the standard cell library 1410 of FIG. 9. That is, the processor 1100 may execute the P&R module 1220 to substitute a flip-flop cell, where a hold time is non-critical in the function operation mode, with the flip-flop latch cell, based on the standard cell library 1410 of FIG. 9.

In operation S127, when the flip-flop cell is substituted with the flip-flop latch cell, the processor 1100 may again route standard cells, based on a polarity of a clock signal.

When the flip-flop cell is not included in the timing path where the hold timing margin is equal to or greater than the certain value, the processor 1100 may place standard cells as-is without substituting the flip-flop cell and may route the placed standard cells.

When the routing is completed, the processor 1100 may generate the layout data of the IC.

Referring again to FIGS. 7 and 10, in operation S130, by using the STA module 1230, the processor 1100 may perform an STA operation on the layout data.

In operation S130, the processor 1100 may execute code included in the STA module 1230 to determine whether a timing is violated. "Timing analysis" may denote an operation of determining whether timing paths included in an IC satisfy a timing constraint condition (timing constraints), and selecting a timing critical path of the IC or a timing path, where a total timing delay from an input (i.e., a start point) to an output (i.e., an end point) exceeds a timing requirement condition (timing requirements), from among the timing paths, based on a result of the determination. The timing constraint condition may include a setup timing constraint condition and a hold timing constraint condition.

When it is determined that the timing is not violated, the design operation may end. On the other hand, when it is determined that the timing is violated, the processor 1100 may perform operation S120 again.

Based on a timing analysis determination result, the processor 1100 may execute the P&R module 1220 to substitute at least some flip-flop cells with flip-flop latch cells or to substitute at least some flip-flop latch cells with flip-flop cells. For example, the processor 1100 may execute the P&R module 1220, and thus, in a timing path where the hold timing margin is sufficient, a flip-flop cell may be substituted with a flip-flop latch cell. On the other hand, when the hold timing margin is insufficient, the processor 1100 may execute the P&R module 1220 to substitute a flip-flop latch cell with a flip-flop cell. Also, in operation S120 which is again performed, after a standard cell is substituted, the standard cell may be again connected to the scan test circuit, based on a polarity of the clock signal.

FIG. 13 is a flowchart for describing a method of manufacturing an IC, according to an example embodiment.

Referring to FIG. 13, the method of manufacturing an IC may be divided into operation S10 of designing an IC and operation S20 of manufacturing the IC. Operation S20 of manufacturing the IC may be an operation of manufacturing a semiconductor device based on the IC by using layout data which is generated in operation S10 of designing the IC and may be performed by a semiconductor process module. The IC manufactured by the manufacturing method may be the IC 10 of FIG. 1, and thus, may include one of the first synchronous circuits 100_1, 100_1', 100_1a, and 100_1b of FIGS. 2, 3A, 3B, 4, 5, and 6.

In operation S210, a mask may be generated based on the layout data. First, optical proximity correction (OPC) may be performed based on the layout data. In this case, the OPC may denote a process of changing a layout by reflecting an error based on an optical proximity effect. Subsequently, the mask may be manufactured by using a layout obtained through the changing, based on an OPC result. In this case, the mask may be manufactured by using a layout (for example, GDS II in which the OPC is reflected) in which the OPC is reflected.

In operation S220, a semiconductor device where an IC is implemented may be manufactured by using the mask. The semiconductor device where the IC is implemented may be manufactured by performing various semiconductor processes on a semiconductor substrate such as a wafer by using a plurality of masks. For example, a process using a mask may denote a patterning process using a lithography process. A desired pattern may be formed on the semiconductor substrate or a material layer through the patterning process. In this case, the semiconductor processes may include a deposition process, an etching process, an ion process, a cleaning process, etc. Also, the semiconductor processes may include a packaging process of mounting a semiconductor device on a printed circuit board (PCB) and sealing the semiconductor device with a sealant and may also include a test process of testing the semiconductor device or a package.

While example embodiments of the inventive concepts have been particularly shown and described with reference to some example embodiments thereof, it will be understood that various changes in form and details may be made therein without departing from the spirit and scope of the following claims.

What is claimed is:

1. An integrated circuit (IC) comprising:
   a first synchronous circuit configured to operate in synchronization with a clock signal, the first synchronous circuit including,
      a selector including a first input terminal, a second input terminal and a third input terminal, the first input terminal configured to receive a first input signal, the second input terminal configured to receive a second input signal, and the third input terminal configured to receive a scan enable signal, the scan enable signal instructing the first synchronous circuit to operate in one of a scan test mode and a function operation mode; and a reconfigurable latch configured to selectively switch between operating as a flip-flop in the scan test mode and operating as a latch in the function operation mode such that, in the scan test mode the reconfigurable latch operates as a flip-flop to synchronously output a first output signal corresponding to the first input signal and in the function operation mode the reconfigurable latch operates as a single latch to transparently output a second output signal corresponding to the second input signal.

2. The IC of claim 1, wherein the reconfigurable latch comprises:

a first node configured to output the first output signal; and a second node configured to output the second output signal.

3. The IC of claim 1, wherein the selector is configured to select one of the first input signal and the second input signal to output as a first internal signal in response to the scan enable signal, and the reconfigurable latch comprises, a master latch configured to transparently latch the first internal signal to output a second internal signal based on the clock signal acting as a first select signal; and a slave latch configured to transparently latch the second internal signal based on the clock signal acting as a second select signal such that the master latch and the slave latch together form a single master-slave flip-flop.

4. The IC of claim 3, wherein the slave latch is configured to receive the scan enable signal, and the slave latch is configured to selectively latch the second internal signal based on the scan enable signal.

5. The IC of claim 4, wherein, in the function operation mode, the IC is configured to block an input of the second internal signal to the slave latch.

6. The IC of claim 3, wherein the master latch and the slave latch each include a plurality of transistors, and a threshold voltage of each of the plurality of transistors of the slave latch is higher than a threshold voltage of each of the plurality of transistors of the master latch.

7. The IC of claim 3, wherein in the scan test mode, the slave latch is configured to output the first output signal, and in the function operation mode, the master latch is configured to output the second output signal.

8. The IC of claim 1, wherein the flip-flop is a negative edge flip-flop, and the reconfigurable latch includes an active high latch.

9. The IC of claim 1, wherein the flip-flop is a positive edge flip-flop, and the reconfigurable latch includes an active low latch.

10. A non-transitory computer readable medium storing a standard cell library which includes information about a plurality of standard cells, which when executed by a processor, configures the processor to, design an integrated circuit including a synchronous circuit which operates in synchronization with a clock signal, the synchronous circuit including, a reconfigurable latch configured to selectively switch, in response to a scan enable signal, between operating as a flip-flop in a scan test mode and operating as a single latch in a function operation mode such that, in the scan test mode the reconfigurable latch operating as the flip-flop synchronously outputs a first output signal corresponding to a first input signal and in the function operation mode the reconfigurable latch operating as the single latch transparently outputs a second output signal corresponding to a second input signal.

11. The non-transitory computer readable medium of claim 10, wherein the synchronous circuit includes a selector configured to select one of the first input signal and the second input signal to output as a first internal signal in response to the scan enable signal, and the reconfigurable latch includes, a master latch configured to transparently latch the first internal signal to output a second internal signal based on the clock signal acting as a first select signal; and a slave latch configured to transparently latch the second internal signal based on the clock signal acting as a second select signal such that the master latch and the slave latch together form a single master-slave flip-flop.

12. The non-transitory computer readable medium of claim 11, wherein the standard cell library, when executed by the processor, further configures the processor to design the integrated circuit such that the integrated circuit further includes, a switching element configured to block an input of the clock signal to the slave latch, based on the scan enable signal.

13. The non-transitory computer readable medium of claim 11, wherein, the standard cell library, when executed by the processor, further configures the processor to design the integrated circuit such that, in the scan test mode, the first output signal is output from the slave latch, and in the function operation mode, the second output signal is output from the master latch.

14. A computing system comprising:

a storage device configured to store a standard cell library including information about a plurality of standard cells including a plurality of flip-flop latch cells and a plurality of flip-flop cells; and a processor configured to design an integrated circuit (IC) including a scan test circuit having a plurality of synchronous circuits configured to operate in synchronization with a clock signal such that at least one of the plurality of synchronous circuits includes, a reconfigurable latch formed using the plurality of standard cells, the reconfigurable latch configured to enable a master latch and a slave latch to operate together as a flip-flop in a scan test mode in response to a scan enable signal having a first logic level, and to operate as a single latch using the master latch to transparently output a signal in a function operation mode in response to the scan enable signal having a second logic level.

15. The computing system of claim 14, wherein the processor is configured to design the IC by selecting standard cells respectively corresponding to the plurality of synchronous circuits, based on input data and the standard cell library such that the processor is configured to substitute a first one of the plurality of flip-flop cells, included in a timing path where a hold timing margin is equal to or greater than a certain value, with a first one of the plurality of flip-flop latch cells.

16. The computing system of claim 15, wherein, the processor is configured to design the IC, such that, in the scan test mode, a polarity of the clock signal input to the reconfigurable latch formed using the first one of the plurality of flip-flop latch cells is opposite to a polarity of the clock signal input to the reconfigurable latch formed using the first one of the plurality of flip-flop cells.

17. The computing system of claim 14, wherein the processor is configured to design the IC by,
- selecting standard cells respectively corresponding to the plurality of synchronous circuits, based on input data and the standard cell library,
- placing and routing the selected standard cells to generate layout data of the IC, and
- substituting a second one of the plurality of flip-flop cells, which is included in a timing path where a hold timing margin is equal to or greater than a certain value in the function operation mode, with a second one of the plurality of flip-flop latch cells.

18. The computing system of claim 17, wherein the processor is configured to again route the selected standard cells, based on the clock signal input to the second one of the plurality flip-flop latch cells.

19. The computing system of claim 14, wherein the processor is configured to design the IC by,
- selecting standard cells respectively corresponding to the plurality of synchronous circuits, based on input data and the standard cell library,
- placing and routing the selected standard cells to generate layout data of the IC,
- performing a timing analysis operation on the layout data, and
- substituting a third one of the plurality of flip-flop latch cells, where a timing is violated in the function operation mode, of the selected standard cells with a third one of plurality of flip-flop cells based on a result of the timing analysis operation.

20. The computing system of claim 19, wherein the processor is configured to again route the selected standard cells, based on the clock signal input to the third one of the plurality of flip-flop latch cells.

* * * * *